Nov. 4, 1969  I. H. LUNDQUIST  3,476,657
METHOD OF FORMING A FONT BELT
Filed March 28, 1968  2 Sheets-Sheet 1
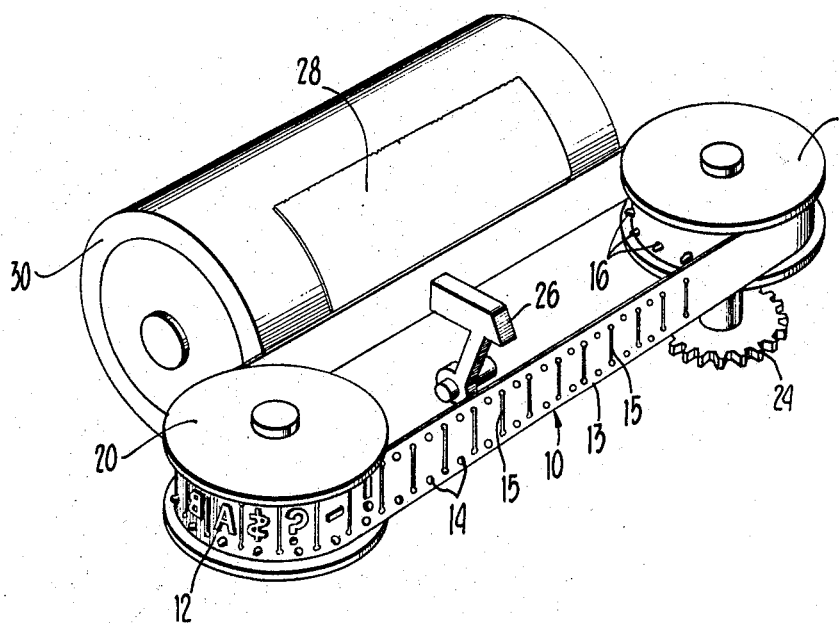
FIG_1
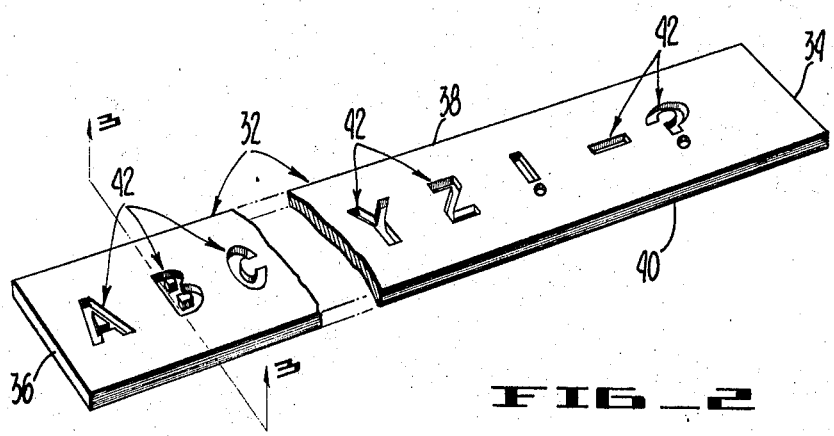
FIG_2
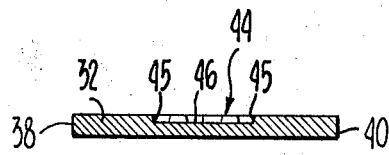
FIG_3
INGEMAR H. LUNDQUIST
INVENTOR.
BY Ronald P. Shipman
AGENT

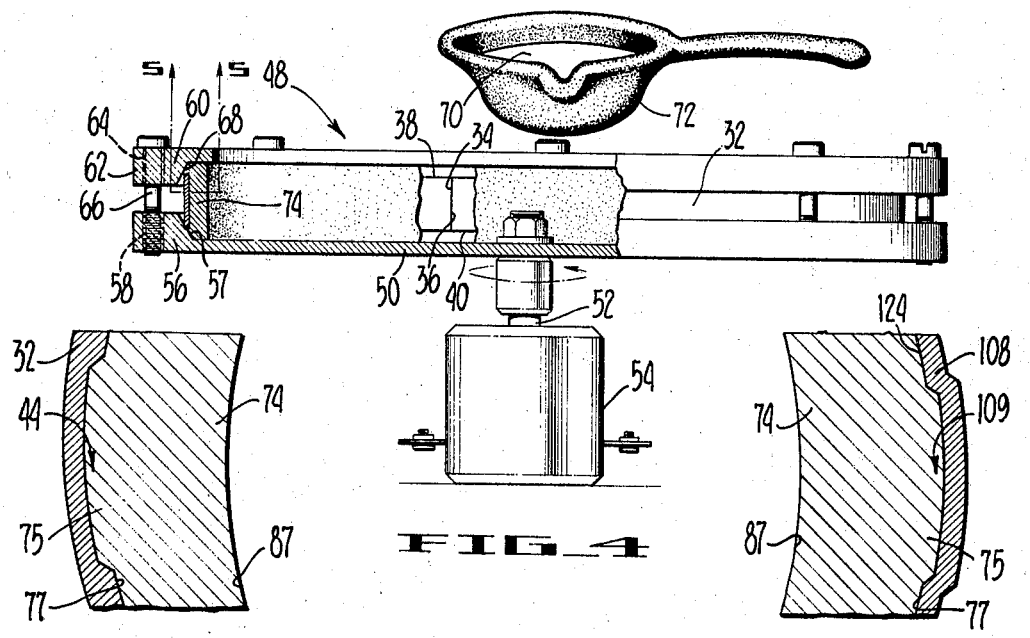
FIG_4
FIG_5          FIG_7
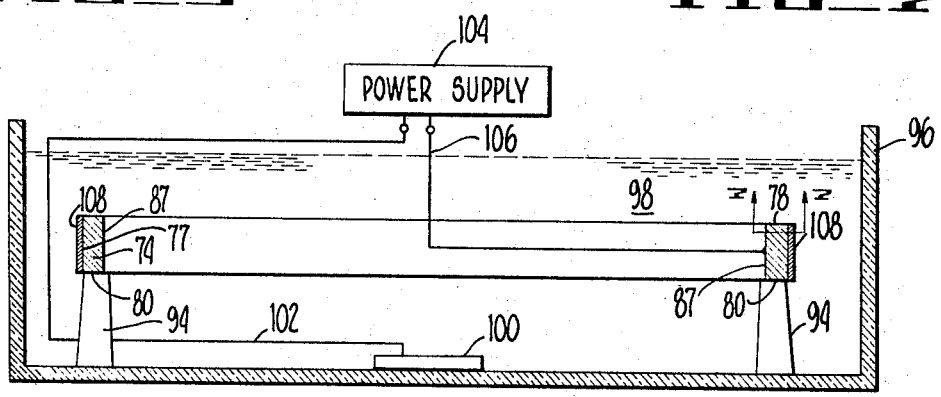
FIG_6
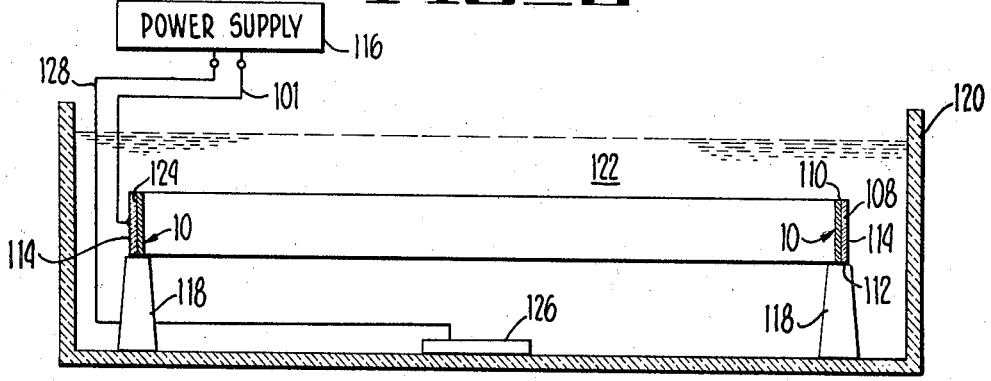
FIG_8

United States Patent Office 3,476,657
Patented Nov. 4, 1969

3,476,657
METHOD OF FORMING A FONT BELT
Ingemar H. Lundquist, Oakland, Calif., assignor to Friden, Inc., a corporation of Delaware
Filed Mar. 28, 1967, Ser. No. 626,622
Int. Cl. C23b 7/04, 5/58; B51c 3/08
U.S. Cl. 204—6       10 Claims

ABSTRACT OF THE DISCLOSURE

A seamless, endless, flexible, metallic font belt having a plurality of printing types formed integral therewith by engraving a set of characters on a flat strip of engraver's metal, flexing the strip into a circular-shaped female mold, upon which is cast an expendable seamless male mold on which a seamless female mold is electroplated, and then electroplating the seamless female mold to obtain the final font belt which is stripped from its mold. A series of slots between printing types may be punched in the belt and the surface of the types may be hardened by chemical treatment.

Background—Field of the invention

This invention relates to a method of forming a font belt for a high-speed printing apparatus, and in particular, to a method of forming an endless belt having a plurality of printing types integral therewith.

Background—Description of prior art

Some presently known high-speed printers utilize a character printing assembly which includes a continuously rotatable, flexible font belt to which individually fabricated printing types are mounted. One example of such a printer and font belt is shown in U.S. Patent No. 3,041,964, Simpson et al.

This kind of font belt has presented problems in that, among other things, it is difficult and expensive to assemble and maintain the individual printing types with the required precise spacing between adjacent characters. By forming the individual characters integral with the belt, proper type spacing is maintained throughout the useful life of the belt. However, an endless belt with printing types formed integral therewith should have no joint that would tend to be weaker than the remainder of the belt. Such joints have a tendency to be the weakest part of the belt and consequently break long before any appreciable wear to the remainder of the belt. Economical methods of forming an endless belt having no joint are, therefore, desirable.

Summary of the invention

According to this invention, a font belt comprises a jointless, flexible, endless, metallic member having printing types integral therewith. Transverse slots, punched, or otherwise suitably formed in the belt between the printing types provide for a high degree of belt flexibility while at the same time permit the striking or printing face of each type to be relatively stiff and free from bending as the belt is driven at high speed in a printing apparatus. The belt may also include sprocket teeth or sprocket holes for positive coupling with a source of motive power.

Also, in accordance with the present invention the method of forming the endless belt includes the steps of engraving a set of characters on a flat strip, forming the strip into a circular shape, casting a disposable male mold having no joints using the flexed engraved strip as a master or female mold, forming a moderately thick, relatively stiff jointless female or working mold by plating the disposable male mold, and forming the final thin, flexible jointless, endless font belt by plating the jointless working mold. A further step of hardening the printing surfaces of the types may be incorporated.

Brief description of the drawings

The organization and method of operation of the invention may best be understood from the following description of a preferred embodiment, when read in connection with the accompanying drawings in which:

FIG. 1 is a simplified perspective of a high-speed printing apparatus employing the endless font belt of the present invention;

FIG. 2 is a perspective, partially broken, of an engraved strip employed in a preferred embodiment of the method of forming an endless, jointless font belt;

FIG. 3 is a cross-section along the line 3—3 of FIG. 2;

FIG. 4 is a side elevation, partially cutaway, of a casting machine, showing the use of the strip of FIG. 2 in forming an expendable mold as one of the steps in forming the font belt of the present invention;

FIG. 5 is an enlarged cross-section along the line 5—5 of FIG. 4 showing a portion of the engraved strip, and the expendable mold;

FIG. 6 is a cross-section of an electroplating apparatus showing the use of the expendable mold of FIGS. 4 and 5 in forming a female jointless mold as one of the steps in forming the font belt of the present invention;

FIG. 7 is an enlarged view along the line 7—7 of FIG. 6 showing a portion of the expendable mold and a portion of the female jointless mold; and FIG. 8 is a cross-section of an electroplating apparatus showing the use of the female jointless mold of FIGS. 6 and 7 as one of the steps in forming the font belt of the present invention.

In the figures similar numerals refer to similar structures.

Description of a preferred embodiment

In FIG. 1 there is illustrated a high-speed printer which includes an endless font belt 10 having a multiplicity of character or printing types 12 integral therewith extending a short distance radially outward, i.e., in relief, of the outer peripheral surface 13 of the belt. A number of sprocket holes 14 are formed in the belt and spaced in corresponding relation to sprocket teeth 16 of driving sprocket wheel 18 and idler sprocket wheel 20 about which the belt 10 is trained. The wheels 18 and 20 are maintained in spaced-apart relation by suitable mounting structure (not shown) so that a degree of tension is maintained in the endless belt during rotation thereof. The wheels 18 and 20 and belt 10 are driven by a rotative power means coupled to the wheel 18, the power means being represented by a gear 24 for the purpose of simplicity.

To effect printing, a hammer 26 is provided to strike the back side of individual types 12 of belt 10 whenever such selected character or type 12 arrives adjacent the hammerhead. A sheet of paper 28 is disposed between a platen 30 and belt 10 to receive the imprint of the selected character or type. The paper 28 may be advanced line-by-line, as well as character-by-character along a line axially of the platen in a well-known manner. An inked ribbon (not shown) may be used with the paper 28 as is well-known in the art to which the present disclosure pertains.

The belt 10 is comprised of a relatively thin, substantially inextensible, but flexible material, such as electroformed nickel alloy, or the like.

A plurality of laterally extending slots 15 are provided in the belt 10, individual ones of which are between a pair of characters 12 thereby providing easy deflection in the radial direction when the back side of a type is struck by the print hammer 26 and providing increased flexibility of the belt about the wheels 18 and 20.

There will now be described the method of forming or manufacturing the endless belt 10. In FIG. 2 there is shown a substantially flat metal strip or master mold 32 having opposite end edges 34 and 36 and opposite side edges 38 and 40. A plurality of characters 42 are engraved, by hand or by machine, in a row lengthwise of the strip. Metal removed from the strip in the engraving process forms, for each character, a groove 44 having generally sloped sidewalls 45 and a bottom wall 46, as shown in FIG. 3. A typical material used in making one form of the master mold 32 is what is generally known as "engraver's brass." Any other material having maximum free machining characteristics may be used.

The master mold 32 is then utilized as part of a centrifugal casting machine for forming a jointless expendable male mold. A floor type, vertical, centrifugal casting machine 48 is shown in FIG. 4 as including a generally disc-shaped table or base member 50 which is mounted on the upper end of a vertically disposed motor shaft 52 for rapid rotation in a horizontal plane about the axis of the shaft when motor 54 is turned on.

An integrally formed annular rim or flange 56 extends upwardly from the upper surface of the base 50 near its perimeter. The flange is provided with an inner radially facing sloped surface 57. A series of circumferentially spaced threaded holes 58 (only one of which is shown in FIG. 4) extend axially through the flange 56.

An annular compression member or clamping ring 60 is formed with an integral peripheral flange 62 through which there is provided a series of axially extending holes 64 spaced circumferentially so as to be axially aligned with corresponding threaded holes 58 of flange 56 when the casting machine is fully assembled, as shown in FIG. 4. Threaded bolts 66 are inserted through each hole 64 and threadedly engaged with the associated aligned threaded hole 58 for holding the master mold or engraved strip 32 in a precise fixed position, as more fully explained below. The clamping ring's flange 62 is provided with an inner radially facing sloped surface 68.

The engraved strip 32 is inserted into the space between the base member 50 and the compression ring 60 and manually flexed or looped into a generally circular or curved shape or annulus with the engraved grooves 44 facing radially inward. The flexed strip is then arranged so that its lower side edge 40 engages the sloping surface 57 and the upper side edge 38 engages the sloping surface 68, and the end edges 34 and 36 generally face or are adjacent each other in abutting relation.

Screwing of the bolts 66 further into the threaded holes 58 will force the compression ring 60 downwardly, which causes the sloped surfaces 57 and 68 to act as wedges on the strip edges 38 and 40 to force the strip to its smallest possible circular configuration, thereby bringing the end edges 34 and 36 into abutting pressure-tight relation with each other. The bolts 66 should only be tightened sufficiently to maintain the strip's end edges 34 and 36 in firm engagement with each other without distorting the vertical flatness of the strip.

The motor 54 is then turned on and allowed to reach full or maximum operating speed.

Disposable electrically conductive mold material, such as an alloy comprised of 40% bismuth and 60% tin which will melt at a relatively low temperature is reduced to its liquid or molten state preparatory to being poured into the revolving casting fixture 48.

In FIG. 4 a quantity of liquid mold material 70 is shown in a ladle 72 for pouring into the rotating fixture 48. The liquid mold material will impinge upon the upper surface of the horizontal plate 50 which will then impart a rotative motion to the liquid mold material whereupon centrifugal force will cause the liquid to flow radially away from the center of the plate 50 to the curved strip 32. With the fixture rotating at a sufficiently large angular speed, the centrifugal force imposed on the liquid will cause the liquid to spread out evenly, in the vertical and circumferential direction, over the strip 32, thereby forming a tubular shaped mass of molten material 74. The liquid mold material will flow under the influence of centrifugal force into the engraved character grooves 44 of strip 32, as illustrated in FIG. 5. Rotation of the fixture 48 is continued until the mold material solidifies by cooling. Upon cooling there is formed a dispensable or expendable jointless male mold 74, cylindrical in shape, and having characters in relief, as indicated by legend numeral 75, on its outer peripheral surface. It may happen that a very small amount of the liquid mold material will creep into the joint formed by the abutting strip edges 34 and 36. If so, the solidified mold will have a very thin vane or feather-like outer radial protrusion. This protrusion can be readily sanded or ground off, thereby providing a smooth surface where the protrusion was located.

The upper compression ring 60 is then removed from the fixture by loosening and removing the bolts 66. The dispensable mold 74 is then lifted out of the fixture with the engraved strip 32 adhering to the periphery of the mold. The engraved strip is then peeled off the mold. Excess mold material that flowed over the side edges 38 and 40 of the strip during casting is then removed by cutting or grinding to form a tubular mold 74 having flat substantially parallel ends 78 and 80, as shown in FIG. 6, for example.

The mold 74 is then used to form a permanent jointless female mold by electroforming.

One end of an electrical lead 106 is attached to the inner surface 87 of the disposable mold 74, as shown in FIG. 6, and the other end is connected to one output terminal of a direct curernt power supply 104. The upper and lower axially facing ends 78 and 80 of the mold, as well as the inner surface 87 of the mold, are coated with a nonelectrically conducting material.

The coated mold 74 is then supported on a plurality of insulating blocks 94 resting on the bottom of a vessel 96. An electrolytic fluid 98 is then poured into the vessel to a height completely submerging the mold 74. The electrolytic fluid 98 is a solution containing ions of the metal to be deposited on the outer peripheral surface 77 of the mold 74.

An electrode 100 formed of the metal to be deposited on the mold 74 is submerged in the electrolyte 98 and has attached thereto one end of an insulated electrical conductor or lead 102, the other end of which is attached to the second output terminal of the direct current power supply 104. When direct current power is furnished on leads 102 and 106, a coating of metal will be formed or deposited on the outer surface 77 of the mold 74. The thickness of the metal coating deposited on the outer surface of the mold 74 is determined primarily by the duration of time that direct current is furnished from the power supply. The metal coat or female mold 108 should be sufficiently thick so that it will be substantially rigid and retain its shape when the expendable mold 74 is removed therefrom, as described below.

The metal from the electrode 100 is deposited on the outer peripheral surface, including the raised character portions of the surface, at a substantialy uniform depth or thickness, as shown in FIG. 7, thereby forming a continuous circular female mold 108 having depressed character-forming or defining grooves 109 which are exact replicas of the engraved character grooves 44 of the strip 32 of FIG. 2.

The expendable mold 74 with the electroformed female mold 108 is then removed from the vessel 96 and they are then separated from each other. This may readily be accomplished by gently applying sufficient heat to the mold 74 to cause the mold material to be liquified and thus flow away from the female mold 108. This step in the process of the present invention provides for separation of the disposable mold and female mold in a manner which substantially obviates any physical damage to the one-piece continuous female mold 108.

The female mold 108 is then used to form the endless belt 32 by an electroforming process similar to that just described for forming the mold 108. As shown in FIG. 8, one end of an electrical lead 101 is attached to the outer periphery 114 of the female mold 108 and the other end is attached to an output terminal of a direct current power supply 116. The coated female mold 108 is then supported on a plurality of insulating blocks 118 resting on the bottom of a vessel 120. An electrolytic fluid 122 is then poured into the vessel to a height completely submerging the mold 108. The electrolytic fluid 122 is a solution containing ions of the metal to be deposited on the inner peripheral surface 124 of the mold 108. In one preferred embodiment, the solution 122 was a sulfamate solution having nickel ions, nickel being the metal to be deposited, such solution being well-known in the art to which the present disclosure pertains. It will be recognized that other solutions containing metallic ions of the metal to be deposited may be utilized.

An electrode 126 formed of the metal to be deposited on the mold 108 is submerged in the solution 122 and has attached thereto one end of an insulated electrical conductor or lead 128. The other end of the conductor 128 is attached to the other output terminal of the direct current power supply 116. The end edges 110 and 112 and the outer peripheral surface 114 of the female mold 108 are coated with a nonconducting coating. When direct current power is furnished on conductors 101 and 128, a coating of metal will be formed or deposited (sometimes referred to as electroformed) on the inner surface 124 of the female mold 108. This coating of metal is the endless belt 10 of FIG. 1. The thickness of the metal coating 10 is determined primarily by the duration of time that current is furnished from the power supply 116. In the mentioned preferred embodiment, using a sulfamate solution, the power supply furnished sixteen amperes at three volts, which caused deposition of a coating at the rate of 0.001 inch per hour, for a period of time sufficient to deposit a coating 10 having a thickness of about 0.0045 inch. The adhering coating of metal 10 is quite thin and flexible and thus may be very readily stripped or peeled from the mold 108.

There is thus formed an endless flexible belt 10 having raised characters or printing types on its outer periphery.

If it is desired to provide slots between the characters, a punching operation can now be performed. In addition, if sprocket holes are desired in the finished endless belt, they also may be punched or drilled in the desired locations.

In one embodiment of the endless belt of the present invention, it was deemed desirable to provide an extra hard surface on the raised printing types. This was accomplished by temporarily attaching an electrical lead to the inner periphery of the endless belt and then applying a nonconductive coating to all but a central circumferential band-like area on the outer periphery of the belt containing the characters. A tough, hard metal is then electroplated on the noncoated area by a process known as "Kanigen plating."

There has thus been shown and described a novel method for forming an endless, jointless, flexible character belt wherein joints or other discontinuities are obviated and printing types are accurately positioned therein.

What is claimed is:

1. A method of making a jointless belt comprising the steps of:
   forming a flexible strip of material having a generally flat surface and opposite ends into a closed loop with said surface facing radially inward and with the ends of the strip in facing abutting relation;
   forming a first jointless member having a radially facing outer surface on the radially inward facing surface of said looped strip;
   removing said looped strip from said first jointless member;
   forming a second jointless member having a radially inwardly facing surface on the radially outward facing surface of said first member;
   removing said second jointless member from said first member; and
   forming a jointless belt on the radially facing inner surface of said second member.

2. A method of forming a jointless font belt according to claim 1 wherein there is further included the step of engraving a set of characters on said strip of material prior to forming said strip into said loop.

3. The method of forming a jointless belt according to claim 1 wherein said first jointless member is formed by casting.

4. The method of forming a jointless belt according to claim 1 wherein:
   said second jointless member is formed by electroplating a coating of metal on the radially outwardly facing surface of said first member,
   and wherein said jointless belt is formed by electroplating a coating of metal on the radially inner facing surface of said second member.

5. The method of forming a jointless font belt according to claim 2 wherein the ends of said looped strip are maintained in tight pressure engagement with each other while said first member is being formed; and
   forming said second member and said belt by electroplating.

6. The method of forming a jointless font belt according to claim 3 wherein said casting is centrifugal casting with a bismuth-tin alloy having a relatively low melting point and being relatively rigid when in the solid state.

7. The method of forming a jointless font belt according to claim 3 wherein said casting forms a rigid first member having characters in relief on its outer surface; and
   wherein said second member is formed by electroplating a substantially rigid ring of metal having characters in intaglio on its inner surface, and
   wherein said belt is formed by electroplating a substantially flexible ring of metal having characters in relief on its outer surface.

8. A method of making a jointless font belt comprising the steps of:
   forming a first female mold by engraving a set of characters on one surface of a generally flat flexible strip of material having opposite ends;
   forming said engraved strip into a loop with said one surface facing radially inwardly and said ends in facing abutting relation; and maintaining said ends in tight abutting relation with each other;
   forming a jointless male mold by casting a metallic substantially rigid male member using said first female mold;
   forming a jointless female mold by electroplating a metallic substantially rigid female member using said jointless male mold as a base upon which metal ions are deposited;
   forming the jointless font belt by electroplating a metallic substantially inextensible but flexible jointless male member using the jointless female mold as a base upon which metal ions are deposited, therein forming a jointless font belt having characters in relief and integral therewith.

9. The method of making the jointless font belt according to claim 8 wherein there is further included the subsequent step of:

removing portions of metal from between adjacent characters of the flexible male member.

10. The method of making the jointless font belt according to claim 8 wherein there is further included the subsequent steps of:

removing portions of metal from between adjacent characters of the flexible male member, and treating the metal forming said characters so as to be harder and less flexible than the remaining metal of the male member.

References Cited

UNITED STATES PATENTS

| | | | |
|---|---|---|---|
| 985,032 | 2/1911 | Hess | 204—6 |
| 1,426,549 | 8/1922 | Corey | 204—6 |
| 1,555,840 | 10/1925 | Hanley | 204—12 |
| 2,287,122 | 6/1942 | Norris | 204—9 |
| 2,670,326 | 2/1954 | Bungay | 204—6 |

FOREIGN PATENTS 10,720  1884  Great Britain.

JOHN H. MACK, Primary Examiner

T. TUFARIELLO, Assistant Examiner

U.S. Cl. X.R.

204—9, 12